United States Patent
Schou

(10) Patent No.: US 7,342,326 B2
(45) Date of Patent: Mar. 11, 2008

(54) CIRCUIT ARRANGEMENT FOR MOMENTARILY MAINTAINING AN INTERNAL OPERATING DIRECT CURRENT VOLTAGE IN THE EVENT OF AN INTERRUPTION IN THE VEHICLE ELECTRICAL SYSTEM POWER SUPPLY VOLTAGE

(75) Inventor: Frank Schou, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/502,211

(22) PCT Filed: Nov. 13, 2002

(86) PCT No.: PCT/DE02/04193

§ 371 (c)(1),
(2), (4) Date: Dec. 22, 2004

(87) PCT Pub. No.: WO03/059681

PCT Pub. Date: Jul. 24, 2003

(65) Prior Publication Data

US 2005/0111152 A1    May 26, 2005

(30) Foreign Application Priority Data

Jan. 18, 2002   (DE) ................................ 102 01 756

(51) Int. Cl.
*H02J 7/34* (2006.01)
*H02J 9/00* (2006.01)

(52) U.S. Cl. .............................. 307/23; 307/56; 307/58; 307/82

(58) Field of Classification Search .................. 307/56, 307/58, 82, 23
See application file for complete search history.

(56) References Cited

U.S. PATENT DOCUMENTS

| | | | |
|---|---|---|---|
| 5,046,149 A | 9/1991 | Nunan | 307/10.1 |
| 5,554,890 A | 9/1996 | Kinoshita | 307/10.1 |
| 5,563,479 A * | 10/1996 | Suzuki | 318/139 |

(Continued)

FOREIGN PATENT DOCUMENTS

GB          2246648 A  *  2/1992

OTHER PUBLICATIONS

Walter, Bill. "No Space? No Problem for these Tiny, Inductorless, Efficient, Low Noise, 1.8V and 1.5V Step-Down DC/DC Converters", Linear Technology Magazine, Dec. 2001, pp. 25-26 and 29.*

*Primary Examiner*—Michael Sherry
*Assistant Examiner*—Hal I Kaplan
(74) *Attorney, Agent, or Firm*—Kenyon & Kenyon LLP

(57) ABSTRACT

A circuit arrangement, to which the vehicle electric system supply voltage is applied and which for briefly maintaining at least one internal normal d.c. voltage in the event of failure of the vehicle electric system supply voltage, includes a reserve energy accumulator, to which a charging voltage higher than the at least one internal normal d.c. voltage is applied in regular operation, and which, in the event of failure of the vehicle electric system supply voltage, delivers a reserve voltage with which operation of at least some electronic circuits may be maintained for a limited period of time, and it includes at least one step-down regulator which steps down the applied input direct voltage to the at least one internal normal d.c. voltage.

8 Claims, 1 Drawing Sheet

U.S. PATENT DOCUMENTS

| | | | |
|---|---|---|---|
| 5,710,699 A * | 1/1998 | King et al. | 363/132 |
| 5,986,354 A * | 11/1999 | Nagao et al. | 307/64 |
| 6,243,277 B1 * | 6/2001 | Sun et al. | 363/65 |
| 6,369,461 B1 * | 4/2002 | Jungreis et al. | 307/46 |
| 6,512,308 B2 * | 1/2003 | Boezen et al. | 307/10.1 |
| 6,861,767 B2 * | 3/2005 | Amano et al. | 307/10.1 |
| 2003/0145256 A1 * | 7/2003 | Jehlicka et al. | 714/48 |

* cited by examiner

CIRCUIT ARRANGEMENT FOR MOMENTARILY MAINTAINING AN INTERNAL OPERATING DIRECT CURRENT VOLTAGE IN THE EVENT OF AN INTERRUPTION IN THE VEHICLE ELECTRICAL SYSTEM POWER SUPPLY VOLTAGE

FIELD OF THE INVENTION

The present invention is directed to a circuit arrangement.

BACKGROUND INFORMATION

To an increasing extent, electronic circuits in the automotive field must be able to fulfill a full or restricted scope of functions (sending messages to telephone modules for emergency calls, deployment of airbags, etc.) for a certain period of time (reserve power time) after the vehicle electric supply voltage has been shut down or the battery has been disconnected (e.g., in a collision).

In control units today, the power required for this is typically stored temporarily in a capacitor. According to the equation $W=\frac{1}{2}C\,U^2$, this power is proportional to capacitance C of the capacitor and the square of voltage U. To minimize capacitance C of the capacitor and be able to store a large amount of power, the capacitor is usually charged to a voltage which is higher than the vehicle electric system supply voltage, via a step-up regulator, which is generally designed as a switching regulator.

In the event of loss of power supply voltage, power is taken from the reserve energy capacitor via one or more step-down regulators which generate the required internal normal d.c. voltage(s).

This is explained in greater detail below with reference to FIG. 1 of the drawing.

FIG. 1 shows a circuit arrangement known from the related art in a highly schematized style, with vehicle electric system supply voltage $V_{BAT}$ being supplied to the voltage input at the left in the figure via a non-reversible diode 1 and the voltage output at the right in the figure delivering an internal normal d.c. voltage $V_{CC}$ which is usually lower than vehicle electric system supply voltage $V_{BAT}$ for the power supply to downstream electronic circuits (not shown).

To be able to maintain internal normal d.c. voltage $V_{CC}$ for at least a short period of time in the event of failure of vehicle electric system supply voltage $V_{BAT}$ so that at least some of the downstream electronic circuits will be able to continue operating satisfactorily, the known circuit arrangement includes an energy storage mechanism designed as a capacitor 3, which is charged to a voltage distinctly higher than vehicle electric system supply voltage $V_{BAT}$ during regular operation to minimize the size of capacitor 3 for cost reasons and nevertheless store as much power as possible in it, and thus be able to bridge the gap for the longest possible period of time in the event of an emergency. To generate a much higher charging voltage for capacitor 3 from vehicle electric system supply voltage $V_{BAT}$, a step-up regulator 5 is situated between non-reversible diode 1 and capacitor 3, the output voltage of this step-up regulator functioning in regular operation as the charging voltage for capacitor 3 and also as input direct voltage $V_{ZP}$ for a step-down regulator 7, which generates from this input direct voltage $V_{ZP}$ normal d.c. voltage $V_{CC}$ which is actually needed.

In an emergency, from reserve voltage $V_{RES}$ which is supplied by capacitor 3 and is high at first but then drops continuously, this step-down regulator 7 maintains normal d.c. voltage $V_{CC}$ for as long as possible.

Step-down regulator 7 is part of a closed loop including a comparator (not shown) which compares internal normal d.c. voltage $V_{CC}$ with a predetermined setpoint value and including a final controlling element (not shown) which supplies step-down regulator 7 with a control signal that varies as a function of the voltage difference detected by the comparator.

Two fundamentally different types of such step-down regulators are known.

First, a linear regulator may be used here, including a longitudinal transistor whose on-state voltage is varied so that it is equal to the required difference between input direct voltage $V_{ZP}$ and internal normal d.c. voltage $V_{CC}$ which is to be established. This procedure takes place in regular operation and also during emergency operation in which input direct voltage $V_{ZP}$ is then equal to progressively declining reserve voltage $V_{RES}$ delivered by capacitor 3. The simple design of such a linear regulator is advantageous, but it has the disadvantage that during emergency operation it causes a power loss for at least as long as reserve voltage $V_{RES}$ is significantly higher than internal normal d.c. voltage $V_{CC}$ that is to be established.

As an alternative, a switching regulator whose longitudinal transistor is alternately completely conducting or completely blocked with the help of triggering pulses may also be used here. Depending on the size of input direct voltage $V_{ZP}$, the pulse duty factor of the triggering pulses is varied, so that required internal normal d.c. voltage $V_{CC}$ is obtained at a downstream smoothing capacitor. This is advantageous in emergency operation in particular because the power losses remain low regardless of the size of input direct voltage $V_{ZP}=V_{RES}$, but this comes at the expense of a much greater circuit complexity.

Step-up regulator 5 is required in the related art but it has a number of other disadvantages apart from the complex circuitry and the increased space required. For example, it requires an inductance which is difficult to implement as an integrated circuit and it creates an additional power loss which has a negative effect on the efficiency of the arrangement and increases the complexity for dissipation of the heat thus generated. It also has a negative effect on the EMC (electromagnetic compatibility) properties of the arrangement because it increases EMC emissions.

SUMMARY OF THE INVENTION

The circuit arrangement according to the present invention has the advantage that a step-up regulator may be omitted completely in a "high-voltage vehicle electric system." This prevents the associated power losses and greatly improves the efficiency of the overall arrangement. Less heat is generated, so this reduces the complexity required for dissipating heat. This arrangement is easily integratable because it does not contain any inductors. Emission of interference signals is reduced and less circuit board area is required while the overall cost is reduced due to the reduction in components.

DETAILED DESCRIPTION

Figure 1:
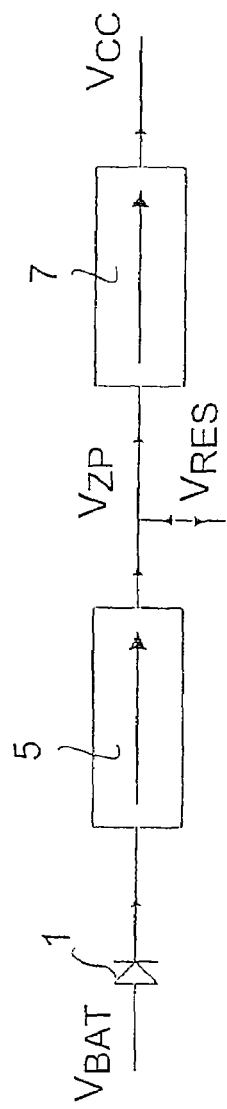
FIG. 1 shows a known circuit arrangement for briefly maintaining at least one internal normal d.c. voltage for electronic circuits in the event of failure of the vehicle electric system supply voltage.
Figure 2:
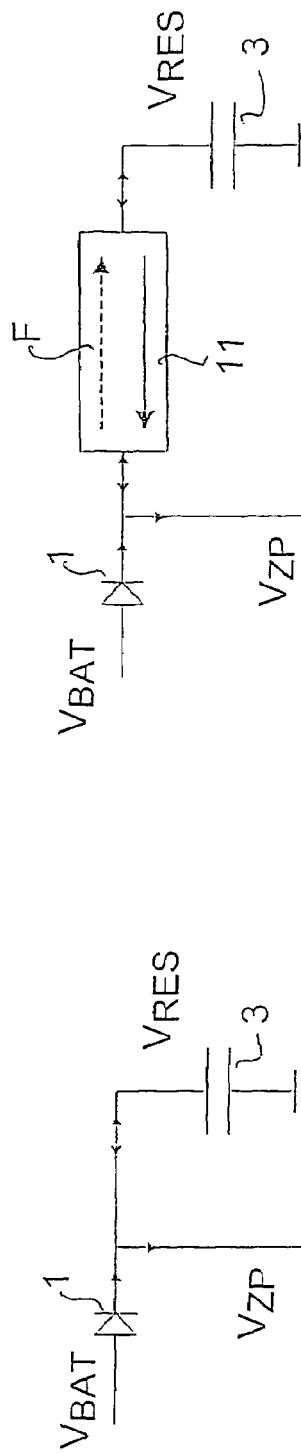
FIG. 2 shows a circuit arrangement according to an exemplary embodiment of the present invention.
Figure 3:
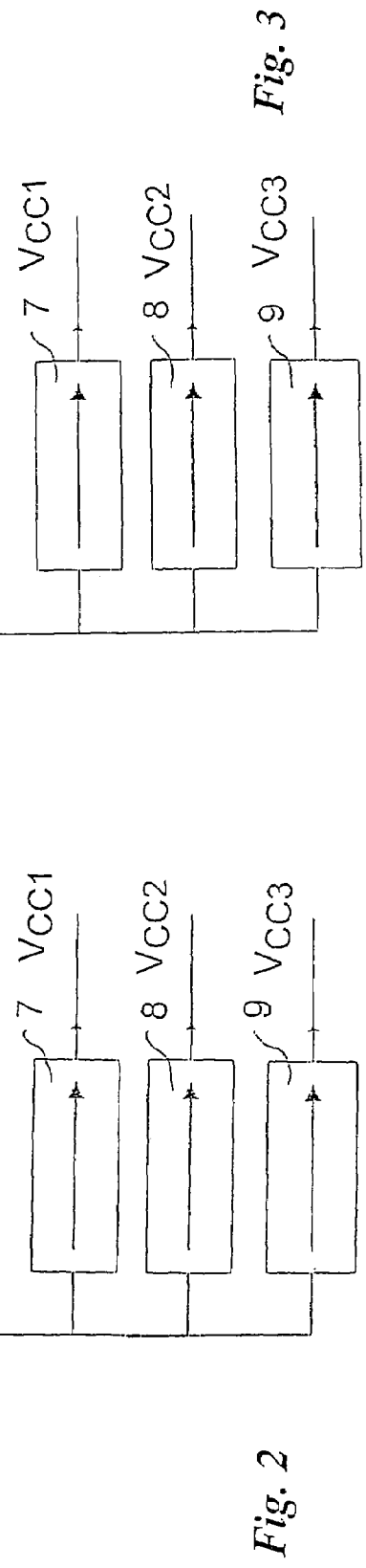
FIG. 3 shows a circuit arrangement according to another exemplary embodiment of the present invention.

In the circuit arrangements according to the present invention as depicted in FIGS. 2 and 3, the same reference numbers are used for circuit elements that are included in the same way as in the arrangement shown in FIG. 1.

Each of the two circuit arrangements depicted in FIGS. 2 and 3, both highly schematized, receives a vehicle electric system supply voltage $V_{BAT}$ via a non-reversible diode 1, but this vehicle electric system supply voltage comes from a "high-voltage vehicle electric system" amounting to 42 V, for example. According to the present invention, this voltage is applied directly to capacitor 3, which functions as an energy storage mechanism, because no step-up transformation is necessary since it is already a high voltage. As explained in greater detail below, this is also the case in the exemplary embodiment depicted in FIG. 3.

In addition, each of the two circuit arrangements depicted in FIGS. 2 and 3 has at least one step-down regulator 7 generating at least one internal normal d.c. voltage $V_{CC1}$ from its high input direct voltage $V_{ZP}$ (which in emergency operation is equal to reserve voltage $V_{RES}$ supplied by capacitor 3).

In embodiments that are particularly preferred, other step-down regulators 8, 9, etc. may be connected in parallel with this at least one step-down regulator 7 so that voltage $V_{ZP}$ which is supplied to them by non-reversible diode 1 in normal operation and reserve voltage $V_{RES}$ which is supplied by capacitor 3 in emergency operation (or a voltage derived from this in the case of FIG. 3) are supplied to them as an input direct voltage while they deliver another internal normal d.c. voltage $V_{CC2}$, $V_{CC3}$, etc. at their respective outputs, this voltage in each case being used for power supply by a separate group of downstream electronic circuits. Individual internal normal d.c. voltages $V_{CC1}$ through $V_{CC3}$ may have the same and/or different values.

Here again, each step-down regulator 7 through 9 shown here is part of a closed loop, as already explained above with reference to FIG. 1.

The exemplary embodiment according to FIG. 3 differs from that in FIG. 2 in which reserve voltage $V_{RES}$ delivered by capacitor 3 is applied directly to step-down regulator(s) 7 through 9 in that in addition to step-down regulator(s) 7 through 9 here, an upstream step-down regulator 11 is also provided between the output of non-reversible diode 1 and capacitor 3. This upstream step-down regulator 11 is designed so that in regular operation it applies the voltage coming from non-reversible diode 1 unchanged, i.e., in particular without step-up transformation, to capacitor 3, as indicated by broken line arrow F. However, in emergency operation, this step-down regulator regulates reserve voltage $V_{RES}$ which is delivered by capacitor 3 and steps it down progressively to the extent that input direct voltage $V_{ZP}$ which is supplied to the at least one step-down regulator 7 and/or a plurality of step-down regulators 7 through 9 is constantly only slightly above normal d.c. voltage $V_{CC1}$ through $V_{CC3}$ which is the greatest to be generated.

This has the great advantage that only upstream step-down regulator 11 need be designed as a comparatively complex switching regulator, while downstream step-down regulators 7 through 9 may be formed by simple and inexpensive linear regulators at which in emergency operation there are no major power losses because of the minor voltage differences between their inputs and outputs due to upstream step-down regulator 11, thus permitting optimum utilization of the reserve power stored in capacitor 3.

In regular operation, upstream step-down regulator 11 remains completely blocked in the downward direction and is completely open in the upward direction, i.e., from non-reversible diode 1 to capacitor 3. This yields the special advantage that particularly high charge levels, which are supplied to capacitor 3 through voltage excesses occurring in the vehicle electric system, are maintained at least as long as capacitor 3 has not discharged to the regular level of voltage coming from non-reversible diode 1 due to parasitic creep currents. In those cases, when a failure of vehicle electric system supply voltage $V_{BAT}$ has occurred within a short period of time after a voltage rise, a particularly high and long-lasting reserve power is available.

LIST OF REFERENCE NOTATION 1 non-reversible diode
3 energy storage mechanism
5 step-up regulator
7 step-down regulator
8 step-down regulator
9 step-down regulator
11 upstream step-down regulator
$V_{BAT}$ vehicle electric system supply voltage
$V_{CC}$ general internal normal d.c. voltage
$V_{CC1}$ first internal normal d.c. voltage
$V_{CC2}$ second internal normal d.c. voltage
$V_{CC3}$ third internal normal d.c. voltage
$V_{RES}$ reserve voltage
$V_{ZP}$ input direct voltage

What is claimed is:

1. A circuit arrangement to which a motor vehicle electric system supply voltage from a high-voltage vehicle electric system is applied and for briefly maintaining at least one internal normal d.c. voltage for electronic circuits in the event of failure of the motor vehicle electric system supply voltage, comprising:

a reserve energy accumulator to which a charging voltage higher than the at least one internal normal d.c. voltage is applied by the high-voltage vehicle electric system during regular operation, and wherein the reserve energy accumulator, in the event of failure of the motor vehicle electric system supply voltage, delivers a reserve voltage with which operation of at least one of the electronic circuits can be maintained for a period of time; and at least one step-down regulator that steps down an input direct voltage applied thereto to the at least one internal normal d.c. voltage, wherein the step-down regulator does not include an inductor, and wherein in regular operation the motor vehicle electric system supply voltage is applied directly by the high-voltage vehicle electric system via a diode as the charging voltage to the reserve energy accumulator and is also applied via a diode as an input direct voltage to the step-down regulator, and wherein the reserve voltage supplied by the reserve energy accumulator is applied directly as input direct voltage to the at least one step-down regulator in an emergency.

2. The circuit arrangement as recited in claim 1, further comprising:

an upstream step-down regulator to which is applied the reserve voltage, the upstream step-down regulator deriving from the reserve voltage the input direct voltage for the at least one step-down regulator.

3. The circuit arrangement as recited in claim 2, wherein:
the upstream step-down regulator includes a switching regulator, and
the at least one step-down regulator includes a linear regulator.

4. The circuit arrangement as recited in claim 1, wherein:
in order to maintain a plurality of internal normal d.c. voltages, the at least one step-down regulator includes a plurality of step-down regulators to which the motor vehicle electric system supply voltage is applied via a diode as an input direct voltage during regular operation, each step-down regulator stepping down the motor vehicle electric system supply voltage to one of the plurality of internal normal d.c. voltages for a group of electronic circuits.

5. The circuit arrangement as recited in claim 4, wherein the reserve voltage is applied directly as an input direct voltage to the plurality of step-down regulators in an emergency.

6. The circuit arrangement as recited in claim 4, further comprising:
an upstream step-down regulator, wherein the reserve voltage is applied to the upstream step-down regulator, the upstream step-down regulator deriving therefrom the input direct voltage for the plurality of step-down regulators.

7. The circuit arrangement as recited in claim 6, wherein:
the upstream step-down regulator includes a switching regulator, and
the plurality of step-down regulators are linear regulators.

8. The circuit arrangement as recited in claim 1, wherein the reserve energy accumulator includes a capacitor.

* * * * *